United States Patent [19]
Loomer

[11] Patent Number: 5,730,274
[45] Date of Patent: Mar. 24, 1998

[54] GAP OPTIMIZER

[75] Inventor: Weston Loomer, Walton, Ky.

[73] Assignee: HK Systems, Inc.

[21] Appl. No.: 633,038

[22] Filed: Apr. 16, 1996

[51] Int. Cl.$^6$ .................................................. B65G 13/04
[52] U.S. Cl. .................. 198/460.1; 198/781.06; 198/784
[58] Field of Search ................ 198/460.1, 781.06, 198/784

[56] References Cited

U.S. PATENT DOCUMENTS

| | | |
|---|---|---|
| 5,137,139 | 8/1992 | Ruscello . |
| 5,201,397 | 4/1993 | Isaacs ........................ 198/460.1 X |
| 5,285,887 | 2/1994 | Hall ........................ 198/460.1 |

*Primary Examiner*—Janice L. Krizek
*Attorney, Agent, or Firm*—Nilles & Nilles SC

[57] ABSTRACT

An apparatus for optimizing the gap between objects on a roller conveyor is provide which enables independent precise speed and acceleration control of individual rollers and articles carried thereon using small, relatively inexpensive motors and control equipment. The present invention consists of adding a differential drive to the roller, arranged so that the majority of the power is transmitted from a common drive through a low ratio input of the differential drive of each roller. A smaller motor capable of more precise control is connected to the high ratio input of the differential drive of each roller. Thus the speed of an individual roller can be altered by adding to or subtracting from the speed of the main drive.

23 Claims, 3 Drawing Sheets

GAP OPTIMIZER

BACKGROUND OF THE INVENTION

1. Field of the Invention

The present invention relates to a gap optimizer. More particularly, the present invention relates to an apparatus for optimizing the gap between objects on a roller conveyor. The apparatus can alter the speed of an individual roller to precisely control the position of an object relative to other objects on the conveyor.

2. Description of the Prior Art

On roller conveyors for conveying articles, it is sometimes advantageous to be able to control the speed and/or acceleration of an individual roller or group of rollers independently of the speed and/or acceleration of rollers adjacent to that roller or group of rollers. Conventional conveyors have a common drive, each drive connecting many rollers in common, and while the speed and/or acceleration of the commonly connected rollers may be controlled as a group, the speed and/or acceleration of any individual roller or group of rollers within the commonly connected group cannot be independently controlled.

Often in the movement of articles with article handling conveyors it is desirable to control the position of a conveyed article in relation to other conveyed articles on the same conveyor. It is also desirable to control the position of random length articles on the same conveyor. Furthermore, it is also desirable to correct the position of such articles relative to the position of other such articles on the same conveyor without incurring slippage between the conveyed article and one or more of the conveying elements which support and convey the articles. Such slippage degrades the performance of the positioning system based on random article dimensions, center of gravity locations, etc., of the conveyed articles.

To remedy such a problem, some conveyors are built with an individual drive motor on each roller, such as in steel mill ingot conveyors. Such motors usually are constructed as torque motors. Motors of the size required to provide the total necessary power for each individual roller and which are capable of precision speed and/or acceleration control are quite expensive as are the high powered control devices used to control such motors.

Current state of the art devices normally rely on conveying articles across a series of conveying elements of progressively increasing velocity in an attempt to open a prescribed gap between articles. Such a technique involves slippage of a random nature between random articles and produces random results. As the velocity of such conveyor systems increases the quality of the results becomes worse with such techniques.

Other devices for producing spacing between articles on conveyors involve the use of a series of servo-controlled belts, timing devices and computer controlled motion controls. Such devices occupy long distances in a conveyor line, are quite expensive but accomplish acceptable results at medium speeds.

SUMMARY OF THE INVENTION

These and other deficiencies of the prior art are addressed by the present invention which is directed to an apparatus which optimizes the gap between articles on a conveyor, enabling independent precise speed and acceleration control of individual rollers and articles carried thereon while using smaller, less expensive motors and control equipment. The present invention consists of adding a differential drive to the roller, arranged so that the majority of the power is transmitted from a common drive through a low ratio input of the differential drive of each roller. A smaller motor capable of more precise control is connected to the high ratio input of the differential drive of each roller. Thus the speed of an individual roller can be altered by adding to or subtracting from the speed of the main drive.

It is an object of the present invention to provide a control circuit algorithm that controls multiple, differential drive conveyor rollers to change the distance and/or relationship of a conveyed article relative to other conveyed articles on the same conveyor.

Another object of the present invention is to provide a control module for a single differential drive roller.

Yet another object of the present invention is to provide a control module for a single differential drive roller that is responsive to the presence or absence of an article conveyed by the roller and the rollers adjacent to it.

A further object of the present invention is to provide a control module to correct the position of a conveyed article in relation to other articles if, and only if, such correction is required.

Another object of the present invention is to provide a connectable control module, where N connectable modules may be connected together in series, (N being whatever number is desired for other reasons than the design of the module) and that the control modules may be identical.

Still another object of the present invention is to provide a control module that will effect the correction of the position of a conveyed article in relation to other articles adjacent the specific article on the same conveyor, by causing all of the differential drive rollers supporting the article to perform the same corrective action in unison as the conveyed article progresses down the conveyor.

Yet another object of the present invention is to provide a control module which conducts corrective action to the relative position of a conveyed article by applying corrective action to only those differential drive rollers associated with correcting the relative position and that other control modules can simultaneously and independently correct the relative position of one or more other conveyed articles on the same conveyor.

Yet another object of the present invention is to provide a control module which inherently adjusts to the length of a conveyed article, such length being random from one conveyed article to those which follow it.

BRIEF DESCRIPTION OF THE DRAWINGS

These and other attributes of the present invention will be described with respect to the following drawings in which.

DETAILED DESCRIPTION OF THE INVENTION

Figure 1:
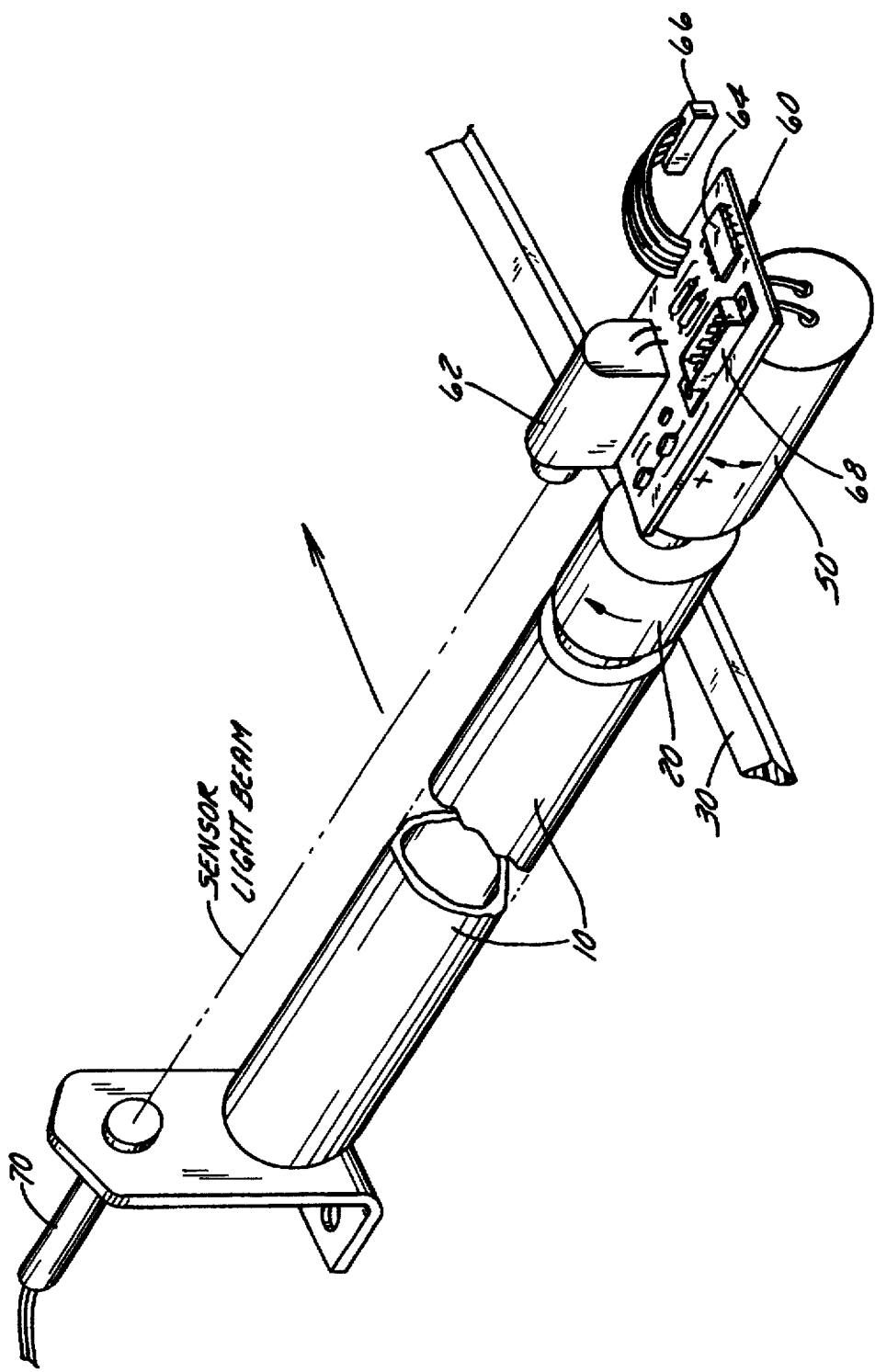
FIG. 1 is a perspective view of an individual conveyor configured according to the present invention.

FIG. 1 shows an embodiment of the present invention, in which a differential drive conveying roller 10 is employed. The low ratio input 20 is friction driven by a continuous V-belt 30. The high ratio input is driven by a motor 50, the motor 50 being controlled by the control module 60. The control module 60 has a photoelectric article sensor 62, motor control circuitry 64 and a plug 66 and socket 68 for interconnection to adjacent modules. A light source 70 projects a light beam towards the photoelectric article sensor 62.

Figure 2:
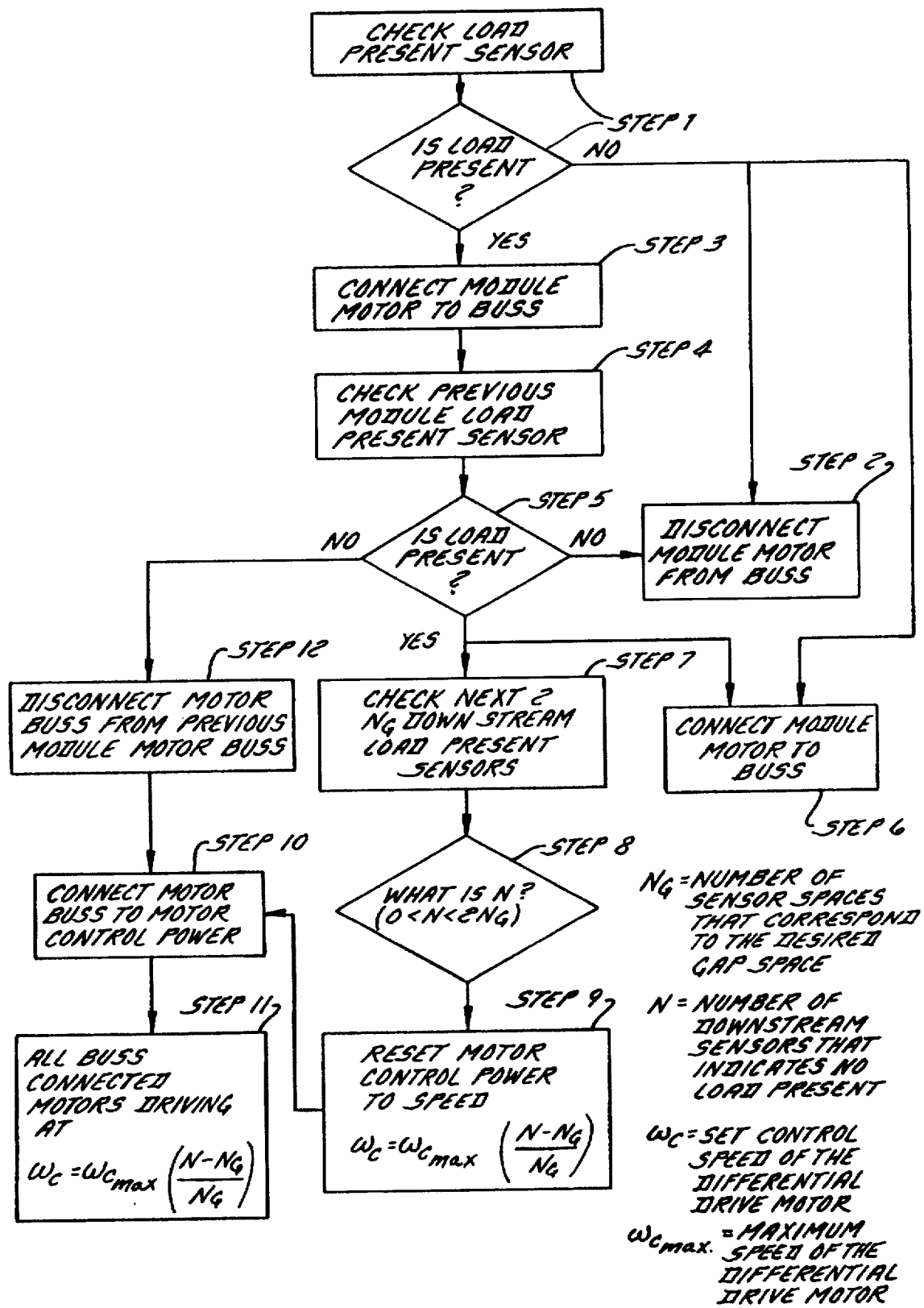
FIG. 2 is a flow chart illustrating the operation of the present invention.

The circuitry of the control module 60 can be of any suitable arrangement of components that functions according to the control module logic flow chart shown in FIG. 2.

In the following description of the operation of the present invention, the discussion will focus on a module H of a group of such modules A–Z (the direction of travel being from A to Z). Starting in a state where no articles are present, the photoelectric article sensor 62 receives the beam of light from the light source 70, indicating no article is present on the roller 10 (Step 1 in FIG. 2). If the preceding control module sensor (G) indicates no article present, as well, the control module motor 50 of control module H will be disconnected from the buss and will be stopped (Step 2). The conveyor roller 10 is then turning at a velocity induced by the common drive through the low ratio input 20 of the differential drive.

As the leading edge of an article passes down the conveyor toward control module H, it will first change the state of the photoelectric article sensor in module G (Step 4). Since the state of control module G is monitored by control module H (Step 5), the sensing of an article by control module G causes the motor 50 of control module H to become connected to the buss (Step 6). (The buss is a common connection for controlled motor power and/or driving information that is by the nature of the control module logic diagram of FIG. 2 a common connection between all motors of modules A–Z controlling the position of an individual article and the next motor downstream from the article, in the direction of article travel.)

In addition to connecting control module H to the buss, the control module 60 will also monitor the next "$2 \times N_G$" downstream photoelectric article sensors, where N corresponds to the length of the desired spacing between the photoelectric article sensor 62 of control module H and the next article downstream from it (if any) (Steps 7 and 8). For example: if the desired gap spacing between articles is 8 inches, and the differential drive modules are spaced along the conveyor on 2 inch centers, then $N_G$, the number of modules corresponding to the desired gap spacing, would equal 8 inches/2 inches space per module=4 modules. Thus, checking the next "$2 \times N_G$" modules would mean checking the next $2 \times 4 = 8$ modules for indication of an article present.

Thus, the control module 60 would check the status of the next downstream sensors I, J, K, L, M, N, O and P, and determine the number (N) of those sensors that indicate no article present. The control module 60 then calculates (Step 9) the proper control module motor direction and speed based on the following:

$$\omega_c = \omega_{cmax} ((N-N_G)/N_G)$$

If all sensors I-P indicate no article is present (gap spacing too large or no downstream article present) then N in the foregoing example would be 8, and since $N_G$ in the example is 4, the calculation for the speed of the motor 50 (Steps 10 and 11) is:

$$\omega_c = \omega_{cmax} ((8-4)/4) = \omega_{cmax} (1) \quad \omega_c = \omega_{cmax}$$

and the motor control power is reset to full speed forward.

If the control modules see the next I, J, K and L sensors indicate no article is present and the next M, N, O and P sensors indicate that an article is present, then N in this case=4 and the calculation becomes:

$$\omega_c = \omega_{cmax} ((4-4)/4)$$

$$\omega_c = 0$$

and the motor 50 control power is reset to a speed=0, because in this case the gap spacing $N_G$ was 4, the detected gap spacing is 4, and the gap spacing require no correction.

If the control module 60 reads that the next article sensor I has no article present, but the following J, K, L, M, N, O and P indicate that an article is present, (gap spacing too small) then N=1, and the calculation becomes:

$$\omega_c = \omega_{cmax} ((1-4)/4)$$

$$\omega_c = -\frac{3}{4} \omega_{cmax}$$

and the motor 50 control power is reset to ¾ of full speed in the reverse direction to retard the velocity of the article being controlled and thereby open up the gap toward the desired result.

From the foregoing it can be readily seen that the present invention is capable of adjusting the relative position of the conveyed article relative to other conveyed articles, and that the rate of adjustment can be made proportional to the amount of deviation from the desired gap by applying the appropriate formula to control the adjustment rate. By establishing the required motor speed and direction to achieve the desired correction, the motor control power is updated to that value and the control module 60 makes connection between the motor buss and the motor control power. All the buss connected motors are then running at the required speed and direction to achieve the desired correction.

Module H in monitoring the photoelectric article sensor of the preceding module G will sense when the trailing edge of the article passes module G. When this occurs, the motor buss of module H is disconnected from the motor buss of module G (Step 12). The motor of module G stops and awaits a new command corresponding to the correction required for the next succeeding conveyed article, whereby the whole process is repeated.

A photoelectric article sensor only initiates the calculation and reset for motor speed once per passing of a conveyed article, and that occurs immediately upon the detection of the leading edge of the article. A motor speed calculation will not be initiated again until the article passes, the sensor 62 senses no article present, and then again senses the leading edge of the next succeeding article at which time the process is repeated.

From the foregoing it can be seen that a connected buss passes down through the series of modules in sequence with the article being conveyed, connections being made in front of the buss, disconnections being made at the rear of the buss in response to and concurrent with the passing of the conveyed article. All motors connected to the buss are connected to the same motor control power, and are running at the same speed and in the same direction to perform, in unison, the corrective action required to change the position of an article being conveyed. After the article has passed, the control module 60 is disconnected from the group controlling that article, and will be reconnected into the next group controlling the position of the following article when it arrives and the process is repeated.

As an article moves along the conveyor, it is sensed, corrective action for that article is calculated, the motor of the unit corresponding to the sensor is connected to the buss controlling the motors that are applying corrective action for that article, and remains corrected, operating in the corrective mode until the article has passed, when the module is then ready to be connected into the next sequence for the following article.

Figure 3:
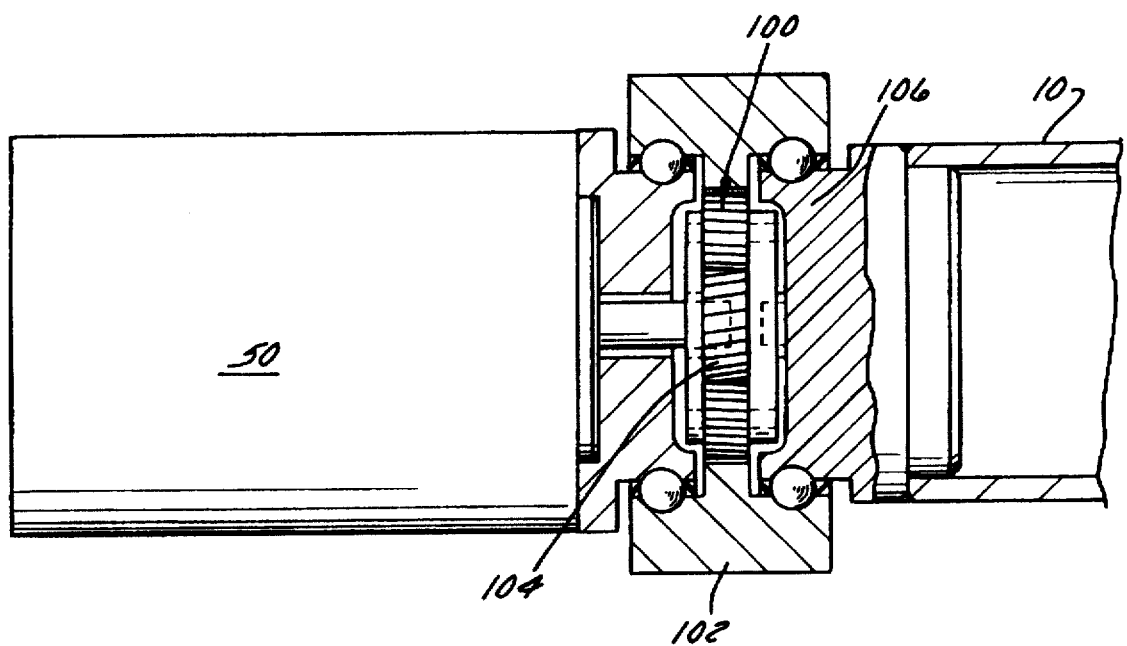
FIG. 3 is a cross-sectional view of a conveyor roll and planetary gear unit of the present invention.

If, referring to FIG. 3, a planetary gear unit 100 is used as the differential in the roller drive, and the ratio of the planetary gear unit 100 is R, and the main or common drive is connected to the outer ring gear 102 (D) of the planetary gear 100 and rotates at $\bar{\omega}_D$, and the control motor 50 is connected to the sun gear 104 of the planetary gear unit 100, rotating it at $\bar{\omega}_C$, and the conveyor roller 10 is connected to the output or planet carrier 106 of the planetary gear unit 100, then the rotational velocity of the roller ($\bar{\omega}_{roll}$) will be:

$$\omega_{roll} = \omega_D (1-(1/R)) + (\omega_C/R)$$

If a motor and planetary gear unit 100 are selected so that ($\bar{\omega}_{Cmax}/R$)=$\bar{\omega}_D(1-(1/R))$ then the conveyor roller 10 can be stopped when the control motor 50 is running in the reverse direction at $-\bar{\omega}_{Cmax}$. If the control motor 50 is stopped ($\bar{\omega}_C$=0) then the conveyor roller 10 turns at $\bar{\omega}_{roll}$= $\bar{\omega}_D(1-(1/R))$.

If the main drive is stopped ($\bar{\omega}_o$=0) the conveyor roller 10 turns at $\bar{\omega}_{roll}$=($\bar{\omega}_C/R$) and if both drives are stopped ($\bar{\omega}_o$=0, $\bar{\omega}_C$=0) then $\bar{\omega}_{roll}$ is also=0. If a control motor 50 and planetary gear ratio are selected so that $\bar{\omega}_{Cmax} > \bar{\omega}_o (1-(1/R))$ then an individual roller 10 can actually be reversed ($\bar{\omega}_{roll}$<0) while rollers adjacent the reversed roller are still being driven in the forward direction.

If desired, to reach the required ratio R (to optimize the motor design) more than one planetary gear unit 100 can be used in series to thereby compound the ratios of each to obtain a larger ratio RF:

$$R_F = R_1 \times R_2 \ldots \text{etc.}$$

Having described several embodiments of the gap optimizer in accordance with the present invention, it is believed that other modifications, variations and changes will be suggested to those skilled in the art in view of the description set forth above. It is therefor to be understood that all such variations, modifications and changes are believed to fall within the scope of the invention as defined in the appended claims.

What is claimed is:

1. An apparatus for adjusting the gap between articles on a roller conveyor having multiple rollers disposed transverse to the direction of article movement, comprising:
   a common drive for all of said multiple rollers; and
   a control module for each one of said multiple rollers, each said control module comprising a motor, a sensor for sensing an article on said one of said multiple rollers, connectors for connecting to adjacent control modules of adjacent ones of said multiple rollers, and means for calculating a speed of said motor;
   wherein said control module receives information from a preceding control module corresponding to an upstream and adjacent one of said multiple rollers so that said control module for said one of said multiple rollers knows when an article is present on said upstream and adjacent roller.

2. An apparatus as recited in claim 1, wherein said control module receives information from a succeeding control module corresponding to a downstream adjacent one of said multiple rollers.

3. An apparatus as recited in claim 1, wherein said sensor is a photoelectric sensor which receives a beam of light from a light source.

4. An apparatus as recited in claim 1, wherein said motor speed is adjusted in proportion to an amount of deviation in gap length between articles.

5. An apparatus as recited in claim 1, wherein said motor is connected to a common buss when said preceding control module transmits information to said control module indicating that an article is present on said upstream adjacent roller.

6. An apparatus as recited in claim 5, wherein said motor is disconnected from said buss when said preceding control module transmits information to said control module indicating that a trailing edge of an article is present on said upstream adjacent roller.

7. An apparatus as recited in claim 1, wherein said control module further comprises a planetary gear unit interconnecting said common drive and said motor to said one of said multiple rollers.

8. An apparatus as recited in claim 7, wherein said motor is connected to a sun gear of said planetary gear unit, said one of said multiple rollers is connected to a planet carrier of said planetary gear unit, and said common drive is connected to an outer ring gear of said planetary gear unit.

9. An apparatus as recited in claim 8, wherein said one of said multiple rollers has a speed $\bar{\omega}_{roll}$ on determined from the following equation:

$$\omega_{(roll)} = \omega_D (1-(1/R)) + (\omega_C/R)$$

where R is the ratio of the planetary gear unit, $\bar{\omega}_D$ is the speed of rotation of said outer ring gear, and $\bar{\omega}_C$ a speed of rotation of said common drive.

10. An apparatus as recited in claim 1, wherein said control module receives additional information from multiple succeeding control modules corresponding to downstream ones of said multiple rollers, wherein a number of said multiple succeeding control modules providing said additional information is determined by a length of said article and spacing of said control modules.

11. An apparatus as recited in claim 10, wherein said means for calculating calculates a speed of said motor based on the following formula:

$$\omega_c = \omega_{cmax} \left( \frac{N - N_G}{N_G} \right)$$

where N is a desired gap between articles, and $N_G$ is a number of control modules corresponding to said gap.

12. An apparatus as recited in claim 11, wherein said motor is run in a reverse direction when $\bar{\omega}_C$ is negative.

13. An apparatus as recited in claim 10, wherein said control module slows said motor when said multiple succeeding control modules indicate a gap of too small a length.

14. An apparatus as recited in claim 10, wherein said control module stops said motor when said multiple succeeding control modules indicate proper gap length.

15. An apparatus as recited in claim 10, wherein said control module reverses said motor when said multiple succeeding control modules indicate a gap of too small a length.

16. An apparatus as recited in claim 10, wherein motors of said control module and said multiple succeeding control modules are connected to one motor control power source.

17. An apparatus as recited in claim 10, wherein said control module controls a speed of said motor to correct a position of said article in conjunction with said motors of said succeeding control modules, said control module disconnecting from said succeeding control modules when said article has passed, and said control module is connected to said preceding control module when a subsequent article is sensed by said preceding control module.

18. A method of adjusting a gap between articles on a roller conveyor having multiple rollers disposed transverse to a direction of article movement, comprising the steps of:
providing a common drive for said multiple rollers;
providing a control module for each of said multiple rollers, each said control module comprising a motor, a sensor for sensing an article on said one of said multiple rollers, connectors for connecting to adjacent control modules of adjacent ones of said multiple rollers, and means for calculating a speed of said motor;
receiving information from a preceding control module corresponding to an upstream adjacent one of said multiple rollers indicating that an article is present on said upstream adjacent roller.

19. A method as recited in claim 18, comprising the further step of connecting said motor to a common buss upon receipt of said information.

20. A method as recited in claim 19 comprising the further step of disconnecting said motor from said buss when said preceding control module transmits information indicating a trailing edge of an article is present on said upstream adjacent roller.

21. A method as recited in claim 18, comprising the further step of receiving additional information from multiple succeeding control modules corresponding to downstream ones of said multiple rollers, wherein a number of said multiple succeeding control modules providing said additional information is determined by a length of said article and spacing of said control modules.

22. A method as recited in claim 21, comprising the further step of calculating said speed of said motor by said calculating means according to the following formula:

$$\omega_c = \omega_{cmax}\left(\frac{N-N_G}{N_G}\right)$$

where $N$ is a desired gap length; $N_G$ is a number of control modules corresponding to said desired gap length.

23. A method as recited in claim 22, wherein said motor is run in reverse when $\bar{\omega}_C$ is negative and is stopped when $\bar{\omega}_C$ is zero.

* * * * *